UNITED STATES PATENT OFFICE.

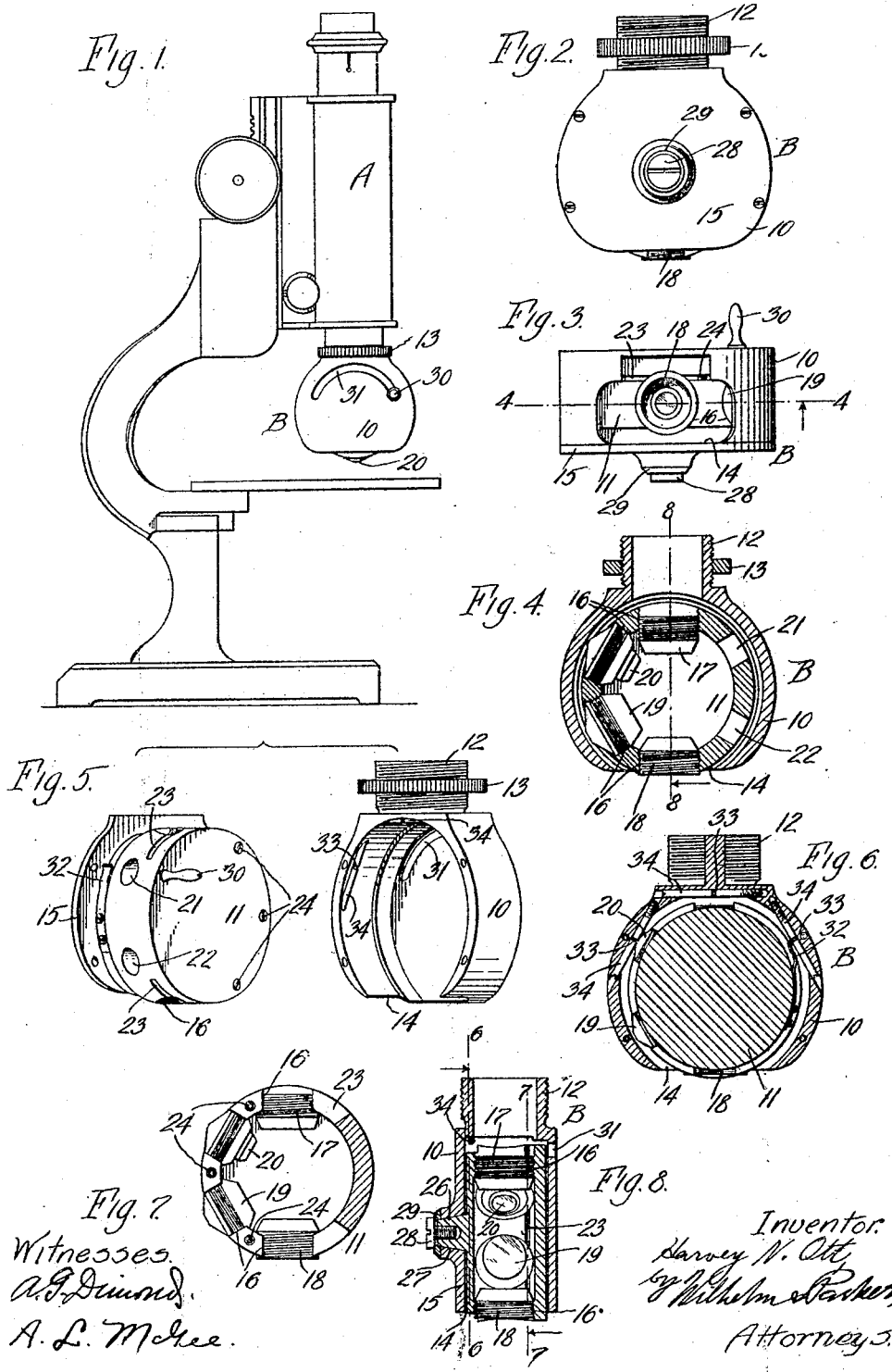

HARVEY N. OTT, OF BUFFALO, NEW YORK, ASSIGNOR TO SPENCER LENS COMPANY, OF BUFFALO, NEW YORK.

OBJECTIVE-MOUNTING FOR MICROSCOPES.

1,197,391.     Specification of Letters Patent.     Patented Sept. 5, 1916.

Application filed April 21, 1915. Serial No. 22,863.

*To all whom it may concern:*

Be it known that I, HARVEY N. OTT, a citizen of the United States, residing at Buffalo, in the county of Erie and State of New York, have invented a new and useful Improvement in Objective-Mountings for Microscopes, of which the following is a specification.

This invention relates to nose pieces or objective holders for microscopes.

Nose pieces or objective holders as heretofore constructed comprise a rotatable carrier or member in which a plurality of objectives of different power or kind are removably secured, and which is adapted to be rotated about an axis extending at an inclination to the optical axis to place one or another of the objectives in operative position in the optical axis. In these nose pieces the objectives project downwardly and outwardly from the rotatable carrier on diverging lines so that when one is in operative position in the optical axis the others project outwardly where they are apt to be struck and injured and are more or less in the way.

One object of the invention is to mount a plurality of objectives in a rotatable turret or carrier in such a manner that they do not project therefrom so as to be liable to injury, and so that they are mounted in a casing or housing which serves to protect them from injury both when they are in use on the microscope and when they are not in use, and which avoids the necessity for separate holders for protecting the objectives when not in use.

Another object of the invention is to provide a construction in which the objective carrier can be arranged to turn about an axis perpendicular to the optical axis and can be of small diameter.

In the accompanying drawings: Figure 1 is a side elevation of a microscope provided with objectives mounted thereon in accordance with this invention. Fig. 2 is a side elevation, full size, of the objective holder showing the opposite side thereof from that represented in Fig. 1. Fig. 3 is a bottom plan view thereof. Fig. 4 is a sectional elevation thereof in line 4—4, Fig. 3. Fig. 5 is a perspective view thereof, showing the objective carrier or turret removed from the casing. Fig. 6 is a sectional elevation thereof in line 6—6, Fig. 8. Fig. 7 is a sectional elevation of the objective carrier or turret in line 7—7, Fig. 8. Fig. 8 is a transverse sectional elevation of the holder in line 8—8, Fig. 4.

A represents the body tube or lens tube of a microscope which, with the exception of the mounting of the objectives thereon, may be of any usual or suitable construction.

B represents the objective holder or nose piece which is mounted at the lower end of the body tube, and comprises a casing or supporting member 10 which is adapted to be removably secured in place on the microscope in any suitable manner, and an objective carrier or turret 11 which is mounted in the casing 10 so as to rotate, preferably about an axis at right angles to the optical axis, to place one or another of several different objectives on the carrier or turret in operative position in the optical axis. In the construction shown, the casing or housing 10 is removably secured to the lower end of the body tube by a screwthreaded nipple 12 at the upper end of the casing which is screwed into an internal thread in the lower end of the body tube and is held from turning by a lock nut 13 on the nipple. The casing has flat sides connected by a curved wall forming a substantially cylindrical chamber which is provided with an opening 14 at the bottom thereof in line with the lens tube. One of the flat sides 15 of the casing is made removable to permit the insertion and removal of the objective carrier. The turret or carrier 11 consists of a hollow cylinder which is provided in its cylindrical wall with radial holes 16 in which the objectives are removably secured. The lower power objectives may consist of two lens cases or shells 17 and 18 located in two of the holes 16 at diametrically opposite sides of the carrier or turret in axial alinement, each shell being provided with one or more of the lenses of the objective system. This objective is thus made in two sections disposed at opposite sides of the turret or carrier in order to secure the necessary distance between the objective lenses in a turret of small diameter and not obstruct the view across the turret to the other objectives. In each of the other objectives 19 and 20, of which two are shown, all of the lenses are mounted in a single case or shell, it being unnecessary with the higher power objectives to make them in sections arranged at opposite sides of the turret as in the case of the low power objective. The cylindrical wall of the turret is provided diametrically opposite the objective 19 with an opening 21 and diametrically opposite the third objective 20 with a similar opening 22, so that when the objective turret is turned to place either of the objectives 19 or 20 in operative position the coöperating opening will afford an unobstructed view through the turret to the objective. The cylindrical wall of the turret shown is provided with a circumferential slit 23 intersecting the holes 16 in which the objectives are screwed, and screws 24 connect the part of the wall between the objectives. By tightening these screws the parts of the wall of the turret can be pinched together to clamp the objectives and prevent them working loose in the holes of the turret. The objectives can be of any suitable construction and they could be mounted and secured in the peripheral wall of the turret in any other suitable way.

The turret or objective carrier can be rotatably mounted in the casing 10 in any suitable manner. As shown, it is provided at one end with a tapered stud journal 26 adapted to turn in a correspondingly tapered bearing hole 27 in the adjacent end of the casing 10. A screw 28 and washer 29 are provided for securing the journal in its bearing and taking up any play therein. Any suitable means can be employed for turning the turret, such, for instance, as a handle 30 secured to one end of the turret and projecting through an arc-shaped slot 31 in the adjacent end of the casing.

In order to arrest the turret when it has been turned to a position to place any one of the objectives in operative position and to hold the turret stationary in such position, a suitable detent device is provided. Preferably a spring detent 32 is secured to the cylindrical wall of the turret and is adapted to snap into stop grooves 33 in three stop screws 34 which are arranged in the casing 10 substantially tangential to the periphery of the turret 11. When the turret is turned the detent is adapted to move lengthwise along said screws and snap into the groove in one or another of the three screws and thus releasably hold the turret stationary in one or another of its three operative positions. By using the stop screws arranged tangentially as described the position of the stop grooves can be adjusted one way or the other by appropriately turning the screws in their screwthreaded holes, thus enabling the stop grooves to be adjusted as required to insure the accurate positioning of the objectives.

The turret having the objectives positioned therein as described could be constructed and rotatably mounted in a suitable protecting casing in various other ways, and any other suitable means could be employed for turning the turret and releasably holding it in its different operative positions.

When the turret is in the position shown in the drawings two parts of the low power objective 17—18 are in position for use, being in line in the optical axis with the outer part 18 of the objective exposed in the opening 14 in the bottom of the casing 10. When the turret is turned to place either of the other objectives 19 or 20 in operative position in the opening 14, an unobstructed view through such objective is afforded through the hole 21 or 22 opposite thereto in the peripheral wall of the turret and through the space between the two parts 17 and 18 of the low power objective. In any position of the turret the operative objective does not project substantially beyond the bottom of the casing 10 and the other objectives are housed within the casing so that all of the objectives are effectually protected from injury, and the objectives do not project out from the body tube so as to be in the way in the use of the instrument. As the casing substantially incloses the objectives they are not liable to injury when the holder B is removed from the microscope, by laying the holder down or handling it, and there is therefore no need for other protecting means for the objectives when they are not in use.

I claim as my invention:

1. In a microscope, the combination with the lens tube, of an objective holder comprising a carrier which is provided with a plurality of objectives and is movable to place one or another of said objectives in operative position on the miscroscope in alinement with the optical axis, and a casing for protecting said objectives.

2. In a microscope, the combination with the lens tube, of an objective holder comprising a carrier which is provided with a plurality of objectives and is movable to place one or another of said objectives in operative position on the microscope in alinement with the optical axis, and a protecting casing in which said objectives are housed and move.

3. In a microscope, the combination with the lens tube, of an objective holder comprising a carrier which is provided with a plurality of objectives, and a protecting casing for said objectives in which said carrier is movably mounted for placing one or another of said objectives in operative position in alinement with the optical axis.

4. In a microscope, the combination with the lens tube, of an objective holder comprising a carrier which is provided with a plurality of objectives, and a protecting casing for said objectives in which said carrier is journaled to rotate for placing one or another of said objectives in operative position in alinement with the optical axis.

5. In a microscope, the combination with the lens tube, of a plurality of objectives, a carrier for said objectives adapted to be movably mounted on the microscope at the end of the lens tube, to move for placing one or another of said objectives in operative position in alinement with the optical axis, and a casing in which said objectives are housed and protected.

6. In a microscope, the combination with the lens tube, of a plurality of objectives, a rotatable carrier for said objectives adapted to be removably mounted on a microscope at the end of the lens tube to turn for placing one or another of said objectives in operative position, and a protecting casing in which said objectives are housed and move.

7. In a microscope, the combination with the lens tube, of a plurality of objectives, a carrier for said objectives, a protecting casing for said objectives adapted to be removably mounted on a microscope at the end of the lens tube and in which said carrier and objectives are rotatably mounted for placing one or another of the objectives in operative position.

8. In a microscope, the combination with the lens tube of a plurality of objectives and a carrier for said objectives mounted on the microscope at the end of the lens tube to rotate about an axis substantially perpendicular to the optical axis for placing one or another of the objectives in alinement with operative position in the optical axis.

9. In a microscope, the combination with the lens tube, of an objective holder comprising a carrier which is adapted to be removably mounted on the microscope at the end of the lens tube to rotate about an axis perpendicular to the optical axis, and a plurality of objectives arranged radially on said carrier and adapted to turn in the plane of the optical axis for placing any one of the objectives in operative position in alinement with the optical axis.

10. In a microscope, the combination of a carrier mounted to rotate in a plane parallel with the plane of the optical axis, and a plurality of objectives arranged radially on said carrier, one or more of which objectives may comprise coöperating parts located in alinement at opposite sides of the center of rotation of the carrier and between which is an unobstructed view space for the other objectives.

11. In a microscope, the combination with the lens tube, of a casing adapted to be removably mounted at the lower end of the lens tube of a microscope and having alined top and bottom openings, an objective carrier rotatably mounted in said casing to rotate in a plane parallel with the plane of the optical axis, and a plurality of objectives arranged substantially radially on said carrier and adapted to be moved into register with said bottom opening in alinement with the optical axis by the rotation of said carrier.

12. In a microscope, the combination with the lens tube, of an objective carrier comprising a hollow shell arranged to rotate in a plane parallel with the plane of the optical axis, and a plurality of objectives arranged radially in openings in the circumferential wall of said shell, one of said objectives comprising coöperating parts located in alinement at diametrically opposite sides of said shell, and said shell having an unobstructed opening in its circumferential wall in alinement with and diametrically opposite another of said objectives, said carrier being rotatable to place one or another of said objectives in alinement with the optical axis.

13. In a microscope, the combination with the lens tube, of a rotatable objective carrier arranged at the end of the lens tube to turn in the plane of the optical axis and provided with a plurality of objectives arranged with their axes in the same plane and adapted to be placed in alinement with the optical axis.

Witness my hand, this 16th day of April, 1915.

HARVEY N. OTT.

Witnesses:
Louis M. Potter,
Arthur A. Hahn.

Copies of this patent may be obtained for five cents each, by addressing the "Commissioner of Patents, Washington, D. C."

It is hereby certified that in Letters Patent No. 1,197,391, granted September 5, 1916, upon the application of Harvey N. Ott, of Buffalo, New York, for an improvement in "Objective-Mountings for Microscopes," errors appear in the printed specification requiring correction as follows: Page 3, line 36, claim 8, strike out the words "alinement with"; same page and claim, line 37, after the word "in" insert the words *alinement with;* and that the said Letters Patent should be read with these corrections therein that the same may conform to the record of the case in the Patent Office.

Signed and sealed this 10th day of October, A. D., 1916.

[SEAL.]

R. F. WHITEHEAD,
*Acting Commissioner of Patents.*